United States Patent
Cuervo et al.

(10) Patent No.: US 8,204,973 B2
(45) Date of Patent: Jun. 19, 2012

(54) ARCHITECTURE FOR CONFIGURATION AND MANAGEMENT OF CROSS-DOMAIN NETWORK SERVICES

(75) Inventors: Fernando Cuervo, Ontario (CA); Pierrick Jacques Guingo, Ontario (CA); Arnoldus Joannes Jacobus Jansen, Ontario (CA); Michel Sim, Ontario (CA)

(73) Assignee: Alcatel Lucent, Paris (FR)

( * ) Notice: Subject to any disclaimer, the term of this patent is extended or adjusted under 35 U.S.C. 154(b) by 1147 days.

(21) Appl. No.: 10/903,445

(22) Filed: Jul. 30, 2004

(65) Prior Publication Data

US 2005/0262232 A1 Nov. 24, 2005

(30) Foreign Application Priority Data

May 20, 2004 (CA) .................................. 2467939

(51) Int. Cl.
*G06F 15/173* (2006.01)
(52) U.S. Cl. ......... 709/223; 709/227; 709/245; 370/254
(58) Field of Classification Search .................. 709/223
See application file for complete search history.

(56) References Cited

U.S. PATENT DOCUMENTS

| | | | |
|---|---|---|---|
| 6,064,666 A | | 5/2000 | Willner et al. |
| 6,392,997 B1 * | | 5/2002 | Chen ............................. 370/252 |
| 6,901,440 B1 * | | 5/2005 | Bimm et al. .................. 709/223 |
| 7,046,669 B1 * | | 5/2006 | Mauger et al. ................ 370/393 |
| 7,197,546 B1 * | | 3/2007 | Bagga et al. .................. 709/223 |
| 2003/0055894 A1 * | | 3/2003 | Yeager et al. ................. 709/204 |
| 2004/0022256 A1 * | | 2/2004 | Green ........................... 370/401 |
| 2004/0128383 A1 * | | 7/2004 | Hinton .......................... 709/225 |
| 2005/0243803 A1 * | | 11/2005 | Fang ............................. 370/352 |

FOREIGN PATENT DOCUMENTS

WO WO 02/06973 A1 1/2002

OTHER PUBLICATIONS

Tsaoussidis, V.; Badr, H.; Na, L.; Song, J.; "A COBRA-Based Application Service Middleware Architecture and Implementation"; Computers and Communications; 1999; Proceedings IEEE Intn'l Symposium of Red Sea, Egypt Jul. 6-8, 1999; pp. 130-136; IEEE; Los Alamitos, CA, USA.

Magedanz, T; Hafezi, A; "Fokus 3G Beyond Testbed and Its Use Within the IST Project OPIUM for OSA/Parlay Interoperability Tests"; Personal, Indoor and Mobile Radio Communications, 2003; 14th IEEE Proceedings Sep. 7-10, 2003; vol. 2; pp. 2993-2997; IEEE; Piscataway, NJ, USA.

* cited by examiner

*Primary Examiner* — Jeffrey R Swearingen (57) ABSTRACT

Apparatus and method are provided for enabling establishment of cross-domain services, including exchange of reachability information between domains, routing of services across domains, and differential labeling. The network element control and management planes are supplemented by additional components that enable the control and management planes of each domain to inter-communicate in a peer-to-peer manner. Adjacencies are established between domains, and service reachability information is exchanged between domains. Network Service Applications within the management planes can then establish services across the domains by inter-communicating.

6 Claims, 4 Drawing Sheets

ARCHITECTURE FOR CONFIGURATION AND MANAGEMENT OF CROSS-DOMAIN NETWORK SERVICES

CROSS-REFERENCE TO OTHER APPLICATIONS

This application claims priority from Canadian Patent Application 2,467,939, entitled "Architecture for Configuration and Management of Cross-Domain Network Services" and filed on May 20, 2004.

FIELD OF THE INVENTION

The invention relates to management and provisioning of telecommunication networks, and more particularly to provisioning of end-to-end network services in multi-domain networks.

BACKGROUND OF THE INVENTION

Many emerging communication network services require interworking of several administration domains, such as IP and Ethernet based Virtual Private Networks (VPNs) spanning the domains of multiple service providers. Configuration and operation of these cross-domain services (whether across administrations, technologies, or multi-vendor network equipment) requires the exchange of service information between disparate systems. Since different domains address provisioning issues in different ways (such as address assignment and bandwidth allocation), the domains cannot establish the service simply and consistently.

Network management infrastructures are currently characterized as technology or service specific management application stacks or silos, each domain being managed by a separate individual domain manager. In order to provide cross-domain services, an overlay of workflow mechanisms is typically used for coordinating cross-domain management processes. This is in effect a manual configuration of the service, a costly and burdensome system integration activity. The services are implemented as business-to-business solutions, each service being effectively manually provisioned after negotiations between the domain administrators, such as the service providers and the long haul backbone operators.

An automated signaling mechanism would allow cross-domain services to be established more quickly and at a lower cost. Automated signaling mechanisms have been used in the network control plane in the various dedicated technology domains (for example, PNNI for ATM network), but have so far shown little progress and adoption beyond intra-domain use. In particular, such signaling mechanisms have failed to support generalized signaling by failing to clearly address key management aspects such as cross domain link connection management and fault correlation, localization, and recovery.

One common architecture for compensating the shortcomings and limited applicability of this automated signaling mechanism at the network control plane is a centralized, hierarchically layered network management architecture that spans many different elements in order to allow cross-domain provisioning and management signaling. However, such a centralized solution will scale poorly, especially as network services become more complex and dynamic, and is typically focused on a single vendor. A centralized solution is equivalent to a cascading set of workflows, and its architecture fundamentally has the same issues. These solutions typically involve several layers of OSS management systems, each layer being built and open to upper layers in an ad-hoc manner. These solutions may use, for example, integration bus technologies such as a publish-subscribe infrastructure. A key shortcoming of these integrations is that they are specific to certain equipment, technology, and even network service. The message content that is exchanged by the many systems is therefore limited to specific services, technologies, and equipment, lacking flexibility to adapt to new services. Therefore, the intelligence added to a Network Element in order to enable a centralized solution is oriented to provide local correlation and aggregation of events and notifications that will be consumed by the upper, hierarchically arranged layer. A centralized solution is costly, since it does not address reduction of complexity and tends to create vertical solutions since the servers providing the solution are provided on a per service basis. The solution is directly connected to the network element infrastructure in which they are deployed, thereby determining their vertical nature and resulting in sub-optimal use of the infrastructure, fragmentation of management control, and top heavy management.

A solution which provided a degree of automation for provisioning and managing cross-domain services would move implementation of such services away from implementations that use business-to-business technologies in ad-hoc manners and towards a network management layer implementation. A solution which provided an architecture which distributed this automated signaling mechanism across domains would be dynamic and flexible, and therefore less costly and more useful than a centralized approach, in light of the fact that centralized solutions are not easy to adapt to new cross-domain services.

SUMMARY OF THE INVENTION

In accordance with one aspect of the invention, a method is provided for provisioning cross-domain services across domains, at least two of the domains differing in at least one of administrator, technology, and vendor. Adjacencies are established between neighbouring domains. A cross-domain managed service layer is formed, thereby extending management and control planes of network elements within each domain to inter-work in a peer-to-peer manner. A service request to establish a cross-domain service is received at one of the domains, and the cross-domain service is established.

The methods may be carried out as part of a management layer, either on network elements within the domain or on stand-alone machines. Such a management layer includes inter-domain adjacency managers for establishing and maintaining physical connections between the domains, signaling inter-working gateways for mapping service requests onto signaling mechanisms recognizable by respective domains, and service request managers for establishing segments within the domain and for coordinating service segments between domains. The methods may be stored as instructions on a computer-readable storage medium, to be executed by a computer processor such as at a network element. An architecture is provided in which the methods may be carried out.

The methods, architecture and apparatus of the present invention allow cross-domain services to be provisioned and managed with minimal manual configuration. The network element control and management planes are supplemented by additional components that enable the control and management planes of each domain to intercommunicate. The components, preferably in the form of software, extend the management and control planes of the network elements to inter-work in a peer to peer manner.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
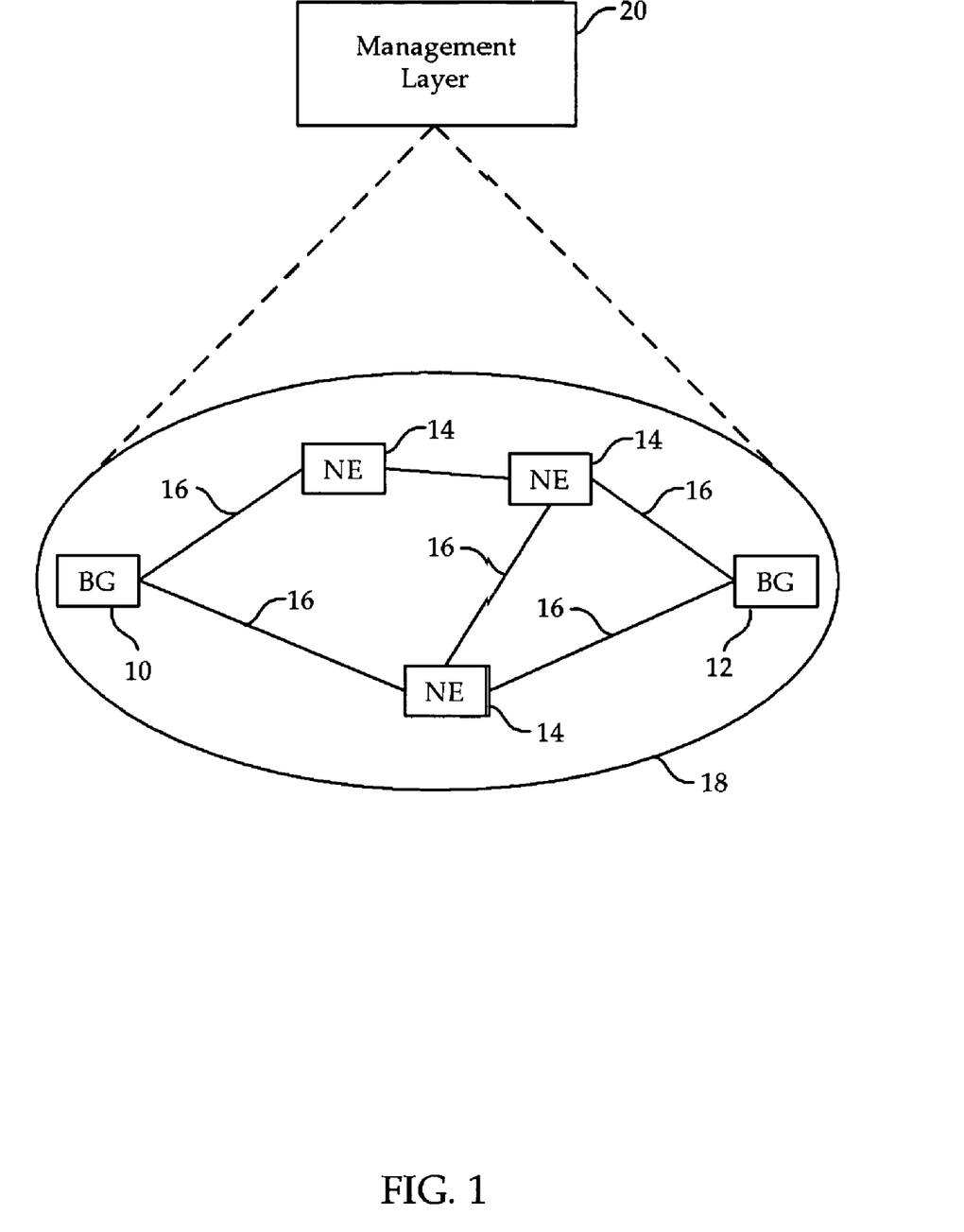
FIG. 1 is a diagram of an example domain in which the invention is implemented according to one embodiment of the invention.

Referring to FIG. 1, an example of a telecommunication domain is shown. The domain includes a first border gateway 10, a second border gateway 12, and a plurality of interior network elements 14. Collectively, the first border gateway 10, the second border gateway 12, and the plurality of interior network elements 14 are referred to as network elements 18 of the domain. The network elements of the domain are variously interconnected by communication links 16. The domain shown in FIG. 1 is for example purposes only. More generally, the domain includes a plurality of network elements, at least two of which are border gateways. The border gateways provide communication access to devices outside the domain, such as border gateways of other domains or end user devices.

The domain also includes a management layer 20. The management layer 20 comprises a plurality of components, including a Service Request Manager, a Service Domain Manager, a Generalized Naming Service, a Signaling Inter-working Gateway, an Inter-domain Adjacency Manager, and a Service Transparency Manager. The properties and operation of these components are described in more detail below. The components are preferably in the form of software instructions located on one or more of the network elements of the domain, in particular on the border gateways as it is the border gateways which communicate directly with other domains according to the invention. Alternatively, the management layer components may be located on separate workstations communicating with the network elements.

Figure 2:
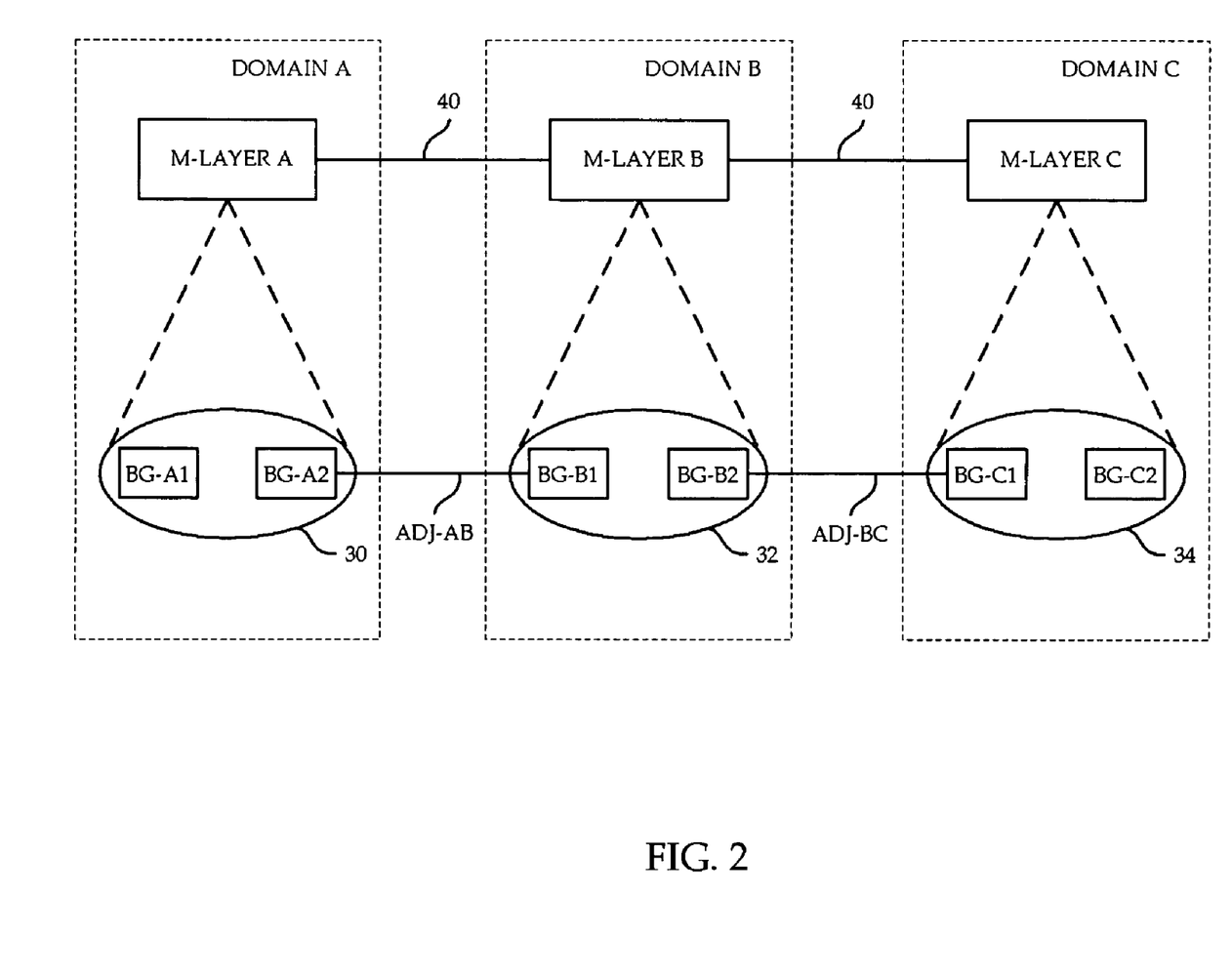
FIG. 2 is a diagram of an example multi-domain network according to one embodiment of the invention.

Referring to FIG. 2, an example multi-domain network is shown. The multi-domain network includes a first domain A, a second domain B, and a third domain C. Each of these domains is similar in concept to the example domain described above with reference to FIG. 1, each domain having a plurality of internal network elements (not shown in FIG. 2), border gateways, and a management layer. The first domain A has a set of network elements 30, including a first border gateway BG-A1 and second border gateway BG-A2, and a management layer M-A. The second domain B has a set of network elements 32, including a first border gateway BG-B1 and second border gateway BG-B2, and a management layer M-B. The third domain C has a set of network elements 34, including a first border gateway BG-C1 and second border gateway BG-C2, and a management layer M-C. The domains A, B, and C are distinct in at least one of technology employed and administration. For example, domain A may be an ATM-based network offering Ethernet transport services over ATM circuits, domain B may be a SONET-based network offering Ethernet transport services using SONET frame encapsulation, and domain C may be a SONET-based network offering the same type of Ethernet transport service but under a different administrative control than that of domain B, and possibly implemented using equipment from a different vendor than that used in domain B.

The management layers in each of the domains communicate with each other over management layer communication channels 40. The management layer communication channels may be in-path or out-of-path, and are described in more detail below with reference to the adjacency management discussion of the exemplary embodiment described with reference to FIG. 4.

An adjacency ADJ-AB exists between the second border gateway BG-A2 of the first domain A and the first border gateway BG-B1 of the second domain B. An adjacency ADJ-BC exists between the second border gateway BG-B2 of the second domain B and the first border gateway BG-C1 of the third domain C. The nature of and establishment of the adjacencies is described in more detail below. The type of physical connection may be of any sort, such as an Ethernet link connection.

The multi-domain network described with reference to FIG. 2 is for example purposes only. More generally, there are a plurality of domains, each distinct in its combination of administration, network service, and implementation technology, within the multi-domain network. Each domain has a management layer which communicates with the management layer of the other domains via management layer communication channels. Each domain has border gateways, and adjacencies exist between border gateways of neighbouring domains.

Figure 3:
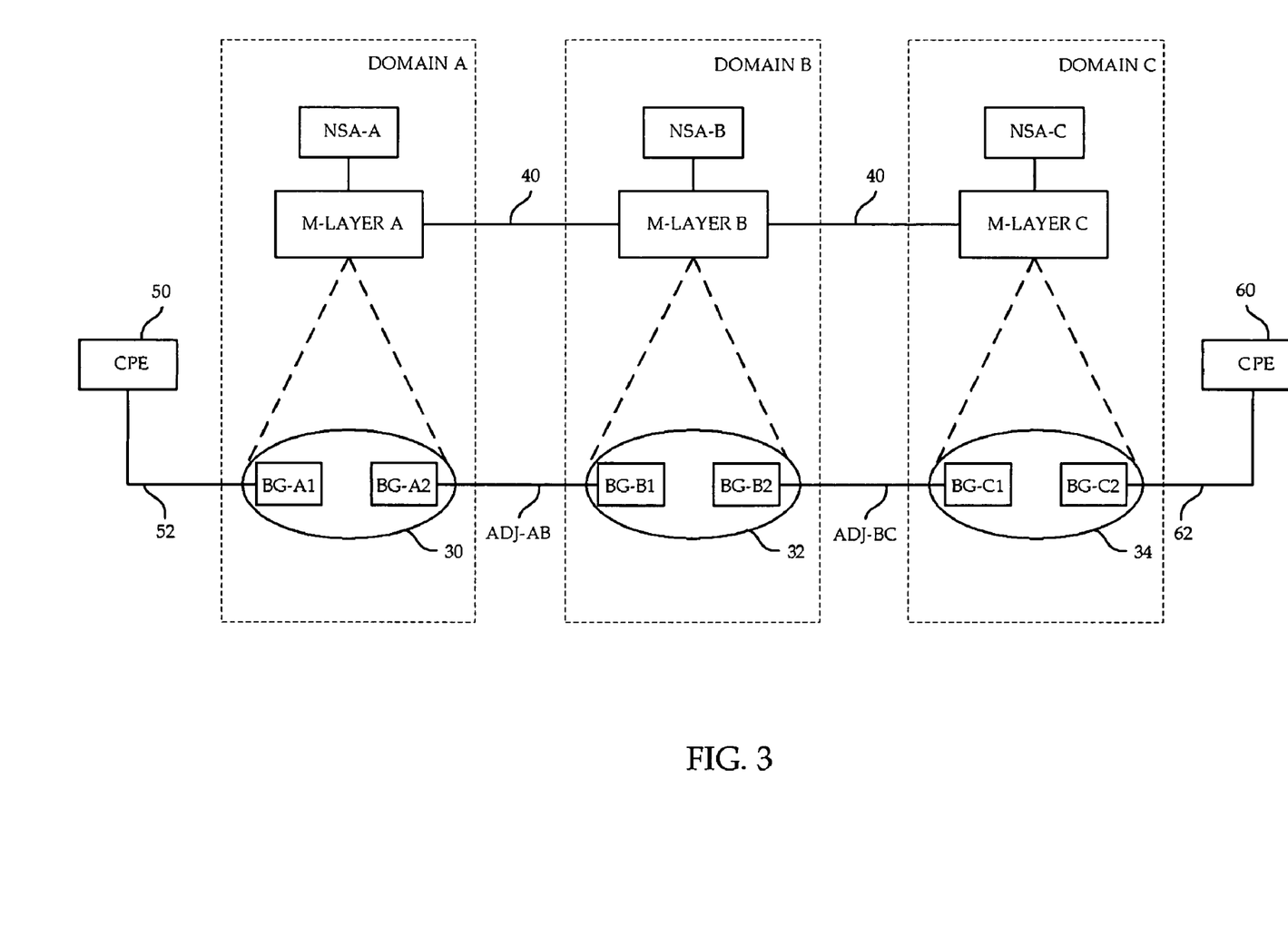
FIG. 3 is a diagram of an example service implemented across the multi-domain network of FIG. 2.

Referring to FIG. 3, an example point-to-point service is shown across the multi-domain network described with reference to FIG. 2. A first end user 50 communicates with the first border gateway BG-A1 of the first domain A through a first Service Access Point (SAP) 52. A second end user 60 communicates with the second border gateway BG-C2 of the third domain C through a second SAP 62. The service is carried over an end-to-end link (which may be connection-oriented or connectionless) from the first end user 50, through the first SAP 52, through the network elements 30 of the first domain A, over the adjacency ADJ-AB between the first domain A and the second domain B, through the network elements 32 of the second domain B, over the adjacency ADJ-BC between the second domain B and the third domain C, through the network elements 34 of the third domain C, and through the second SAP 62 to the second end user 60.

Each domain has a respective Network Service Application NSA-A, NSA-B, and NSA-C, for configuring the particular service between the two end users 50 and 60. In general, one Network Service Application (NSA) exists as a management control process within each domain for each inter-domain service established through the domain. Each NSA acts as a programmability layer for provisioning a particular service. Each NSA uses the Service Domain Manager, the Service Request Manager, the Generalized Naming Server, the Signaling Inter-working Gateway, and the Service Transparency Manager to implement the corresponding inter-domain service within the domain of the NSA.

As stated above, the management layer within each domain functionally includes a number of components for implementing inter-domain services, including a Service Request Manager, a Service Domain Manager, a Generalized Naming Server, a Signaling Inter-working Gateway, an Inter-domain Adjacency Manager, and a Service Transparency Manager. Each Service Request Manager (SRM) contains a transaction and protocol engine that coordinates service segment establishment in the different domains across which a cross-domain service is to be established. The SRM requests cross-domain services by implementing an open mechanism independent of the technology that is connecting the SRM's domain to an adjacent domain through an adjacency. The SRM communicates with an SRM of an adjacent domain using the network management communication channels 40. The SRM also has flexible timers to adapt to differing management timescales of neighbouring domains, and provides both soft-state and hard-state types of notifications to communicate the completion states of service requests.

Each Service Domain Manager (SDM) contains decision logic and a protocol engine that builds service domain reachability by producing and consuming advertisements of the capabilities of a domain to reach other domains using service segments of a particular type, thereby enabling Service Routing. For scalability reasons, the SDMs only provide domain service reachability information (i.e. can an endpoint be reached using a particular service through a given domain, as opposed to end-point address reachability, thereby avoiding the BGP/IP model which is not scalable). The SDMs are also truly open as a policy-based decision process, and provide extensibility in the use and diffusion of third party metrics, another key difference with respect to BGP.

Each Generalized Naming Server (GNS) is a generalized name service that both provides service entity points of presence at the edge of the network and contributes its domain specific information to support a cross-domain naming service for service-level entity organization. The nature of the points of presence is multi-service, so contrary to existing name services such as DNS, the GNS can support many telecom services to a single device. The GNS works together with the SDM to provide the scalability of the system since it can be federated in per domain or per service basis. The cross-domain naming service may be fully distributed or federated.

Each Signaling Inter-working Gateway (SIG) maps out-of-path managed service requests on requests implemented through an existing mechanism, and vice-versa. The SIG provides interoperability with existing signaling protocols by providing pairwise translators between protocols.

Each Inter-domain Adjacency Manager (IAM) establishes and maintains the physical connections of a domain to its neighbours. Each IAM is configured to support or accept a given set of types of services that can be carried over the adjacencies. This may be done for administrative reasons, or for technical limitations.

Each Service Transparency Manager (STM) addresses cross-technology mapping and service transparency issues. The STM controls the configuration of network domain service inter-working functions that may affect the operation of the service, so as to ensure end to end transparency of the network to the end users. The STM provides the APIs to control functions within service segments, that is, transparency functions are in general not known to be applied outside a single domain.

Once these components have been added to the management layer of each domain, either on border gateways or in relation to border gateways, a network-service layer that spans the diverse domains can be visualized as running in tight integration and cooperation with either or both of the native control and management planes of the networks within each domain. This layer provides network-services used by other services, such as services requested by end users.

Before any inter-domain services can be established across multiple domains, the management layers of the domains establish the adjacencies between the domains. This is carried out within each domain by an operator using the Inter-domain Adjacency Manager. The administrators of neighbouring domains, for example domain A and domain B of FIG. 2, agree to provide access for a set of services between the two domains. The administrators arrange a physical connection between border gateways BG-A2 and BG-B1, and agree on an adjacency service contract. The adjacency service contract declares the services that may be supported across the physical connection and declares the policies that apply to each supported service, such as resource allocation and actions to be taken when competition for resources occurs. The adjacency ADJ-AB therefore is defined as the physical connection between BG-A2 and BG-B1, a set of services supported across the physical connection, and policies associated with each of the services within the set of supported services. The adjacency ADJ-AB does not include any actual implementations of a service. Similarly, adjacency ADJ-BC is agreed upon by the administrators of domain B and domain C, and is defined as the physical connection between BG-B2 and BG-C1, a set of services supported across the physical connection, and policies associated with each of the services within the supported services. Of course, two different domains could share an administrator, for example if two domains were operated by the same carrier but employed different network technologies.

Once adjacencies and adjacency service contracts between the domains are established, reachability information can be exchanged between the domains. The SDM of each domain advertises the services it can support to each neighbouring domain. The advertisements are transitive, in that a domain which receives an advertisement passes that advertisement on to its own neighbouring domains. For example, the SDM of domain A of FIG. 2 advertises across adjacency ADJ-AB that it can offer service S. The SDM of domain B forwards the advertisement across adjacency ADJ-BC to domain C. As each domain receives an advertisement, the SDM of the domain updates a routing information table to include an identification of the domain that originated the advertisement, an identification of the service, and the domain from which the advertisement was directly received. In this way, the SDM of each domain builds a routing information table having entries correlating, at least, services, end point domains for the service, and next hops to reach the domains offering the services. The routing information table preferably does not identify end points, so as to prevent the very large routing tables that can occur with more traditional route discovery protocols. An example implementation of a SDM is provided in Canadian Patent Application 2,467,945, entitled "Open Service Discovery and Routing Mechanism for Configuring Cross-Domain Telecommunication Services", filed on May 20, 2004 by the same assignee as that of the present application, and incorporated by reference herein.

It should also be noted that not every adjacency between every domain need be established before advertising of reachability information. A domain could advertise its reachability information once adjacencies for that domain are established.

When an end user requests a service, typically from the administrator of the domain to which the end user's access link leads (the first domain A for the first end user 50 in the example service described above with reference to FIG. 3), the administrator of the domain initiates establishment of the service using the SRM of the domain over which the administrator has control. Alternatively, initiation of the service could be initiated by the end user by communication with the management layer of the domain to which the end user is connected through an SAP, such as through a self-management application or a UNI mechanism. In either event, once the management layer is informed of the service request, routing and establishment of the service is carried out by the management layer components rather than manually by an administrator.

In the example multi-domain network of FIG. 3, the SRM of domain A determines from the GNS that the second end user is reachable through domain C, since the GNS associates end user identifications with domains to which the end users are connected. The SRM then consults the SDM of the domain to determine the next hop for the service being established and for the destination domain, domain C. The SDM determines from the routing information table that domain B is the next hop, and informs the SRM of this. The SRM establishes segments from the border gateway BG-A1, to which the SAP 52 is connected, to the border gateway BG-A2, to which the adjacency ADJ-AB leading to the next hop domain is connected. In so doing, the SRM assigns a label to the service using a dynamic label differentiation mechanism. This label has at least two components, a service component and a local component. The service component identifies the service uniquely across all domains. The local component identifies the service uniquely within domain A. The SRM passes this labeling information to the SRM of domain B. An example dynamic label differentiation mechanism is provided is Canadian Patent Application 2,468,122 entitled "Provisioning of Cross Domain Telecommunication Services through Dynamic Label Differentiation Mechanism", filed on May 20, 2004 by the same assignee as that of the present application, and incorporated by reference herein.

The SRM of domain B consults the SDM of domain B to determine the next hop domain to which the service should be routed. The SDM determines from its own routing information table that the next hop domain is domain C, and informs the SDM of this. The SDM establishes segments from border gateway BG-B1 to border gateway BG-B2, using the label provided by the SDM of domain A. The SDM of domain B preserves the service component of the label so as to maintain the unique identification of the service, but may replace the local component of the label with new values appropriate to the technology used within domain B. The SDM of domain B passes the label information to the SDM of domain C, which acts similarly to complete the segments to the second SAP 62.

The embodiments presented are exemplary only and persons skilled in the art would appreciate that variations to the embodiments described above may be made without departing from the spirit of the invention. The scope of the invention is solely defined by the appended claims.

A further exemplary embodiment will now be discussed.

1. Cross-Domain Integration Approach

The M-layer is defined as the layer that contains NMSs and EMSs. A strict functional hierarchy between NMS, EMS and network elements is assumed for simplicity, although in practice NMS and EMS functions could be integrated in a single platform or organized in different ways. Each technology domain contributes layer-segments (e.g., Ma, Mb or Mc in FIG. 4) which implement specific network services, such as point-to-point connections, VLANs or VPNs within their corresponding domains. For instance, the scope of control of Mb is between the border-gateways that interconnect domain-b to domains a and c. In order to enable cross-domain inter-working, the M-layer is extended by the components described above (the GNS, SRM, and SDM) that support generalized service-naming mechanisms, service routing concepts and dynamic implementation of Service Level Specifications.

Figure 4:
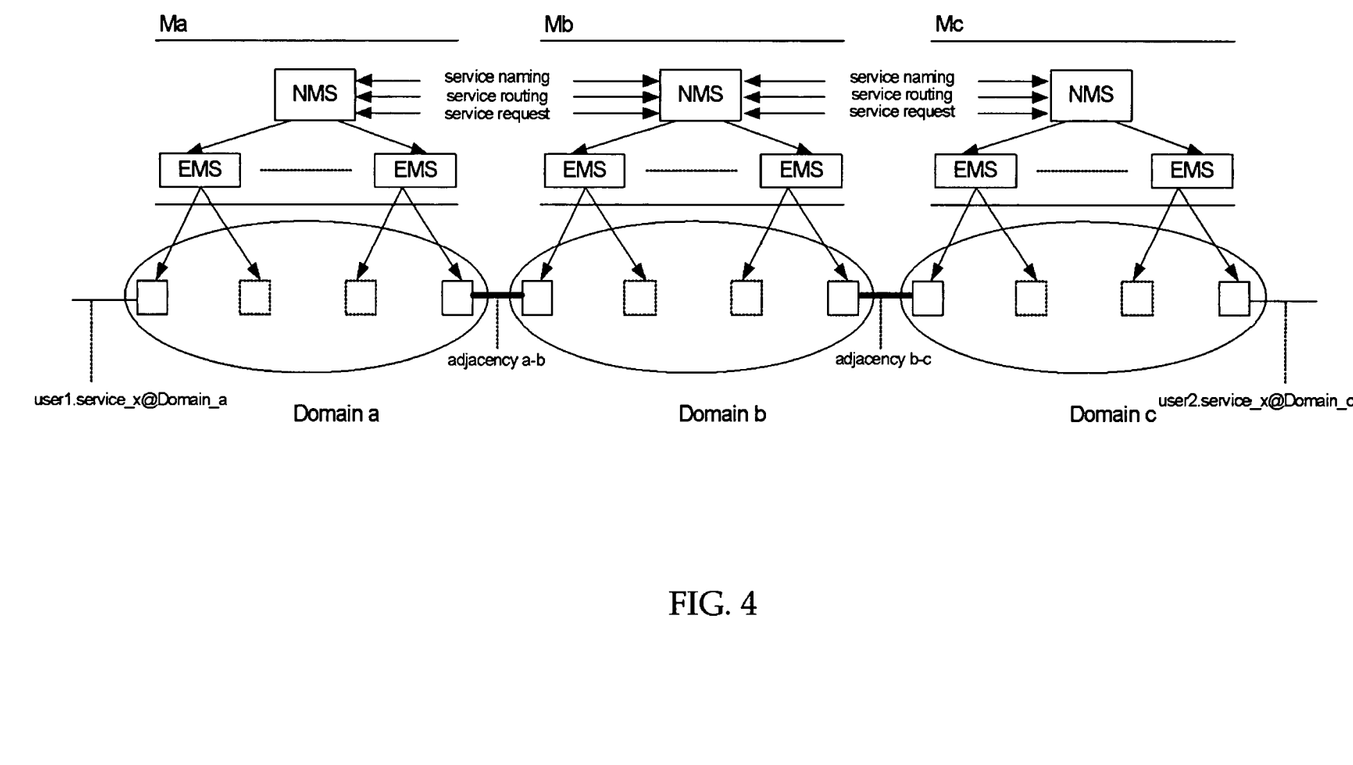
FIG. 4 is a diagram of the main architectural concepts as they are used to support the realization of an instance of a service in an exemplary embodiment of the invention.

The definition of adjacencies between the domains that participate in the implementation of end-to-end services must be realized by the operators when they physically connect their respective border-gateways. An adjacency service contract must declare the services that it is intended to support and the policies that apply, in terms of resource allocation and actions to be taken when competition for resources occurs. In the example, adjacency service contracts for adjacencies a-b and b-c must explicitly indicate support for service_x, they could also include information about the service profiles that are allowed, bandwidth allocation policies, label allocation, etc.

Once each domain has an adjacency fully defined, the service-routing component of the architecture is used. Each NMS in a domain will proceed to advertise over the adjacencies the services that it is able to support, which must be a subset of the services agreed to in the adjacency service contract. Advertisements are transitive, for instance, if domain-b supports service_x and it receives and advertisement from domain a for service_x, it must advertise over adjacency b-c (unless an administrative policy forbids it) that domain a is reachable with service_x. Once all advertisement exchanges have occurred, each NMS has a full view of the end-to-end connectivity that is possible for a particular service. Realization of service instances is subsequently supported by the naming-service and the service-request interactions between NMSs on which the components described above, in particular the SRM and the SDM, have been installed.

A service instance is created when a NMS implements a user-service request. The user-service request may be communicated to the NMS by an OSS, through a self-management application or a UNI mechanism, since all are possible. For the time being, the simplest case can be considered: the end-points are configured in their corresponding domains and resource records describe their point of attachment to the network in the service_x name-service. As a result either end-point may request at anytime connection via service_x to the other end-point. For instance, service_x could be a Virtual Leased Line according to the Metro Ethernet Forum technical specifications, ("Ethernet Service Model Phase 1", www-.metroethernetforum.org), therefore the service could be specified in increments of 1 Mbps, with given CIR/PIR and operational attributes such as MTTR (Mean Time To Repair) or availability. As the service specification is given, say to the NMS in domain-a, the NMS may use the name-service to identify the domain to which the other end-point is attached. In the example given this is trivial since it can be inferred from the name (user2.service_x@Domain_c) that user2 is in domain-c, however, the naming service could use more abstract naming if mobility is to be supported. Once the domain of attachment for the end-point is identified the NMS in Ma uses the service-routing information to determine that adjacency a-b is to be used, and the corresponding NMS in Mb to whom the service-request must be issued.

Each domain that contributes to the end-to-end connectivity must implement a service-segment that joins (in a point-to-point service) either a user's point of attachment and a point of presence at a border gateway, or two points of presence at two border gateways (these are named respectively Service Access Point (SAP) and Service Connection Point (SCP)). Therefore, NMS in Ma builds a service segment to the gateway that supports the adjacency a-b and then requests the NMS in Mb to complete the service from the adjacency to the point of attachment of user2.service_x@Domain_c. The process will repeat in every domain until an end-to-end service is achieved. The service request protocol may also include facilities to test and activate the service.

2 Adjacency Management

Including adjacency management as a basic part of the service architecture is fundamental to solve the cross-domain interoperability. Signaling based approaches such as G-MPLS provide within their framework link management protocols, but the extent of this is to manage adjacencies for the purpose of signaling. Adjacency management in the proposed architecture includes: 1-Adjacency service contracts and 2-Set up and maintenance of adjacency channel to support the cross domain service routing and cross domain requests.

2.1 Adjacency Service Contracts

Adjacency service contracts specify the services that two domains agree to support across an adjacency interface. Adjacency service contracts are modifiable at any time to allow operators to withdraw or add services across an adjacency. Naming a service in an adjacency service contract does only imply that if the domain is capable of supporting it, advertisements for that type of service will not be dropped by the interface or the managed adjacency channel associated with the interface. Therefore, from the point of view of the interface, adjacency contracts can be implemented as policy filters on both the cross-domain service routing protocol (referred to hereinafter as X-BGP) and the cross-domain service request protocol (referred to hereinafter as X-SRP). The adjacency service contract itself is an XML document that specifies the services, how bandwidth can be allocated over the adjacency, who is responsible for the label selection, etc. An appropriate management infrastructure is required to process updates to adjacency service contracts and maintain consistency with the filters that enforce them at the adjacency interfaces.

2.2 Managed Adjacency Channels

Managed adjacency channels provide inter-domain transport for the X-BGP and X-SRP advertisements and requests respectively. Adjacency channels can be in-path or out-of-path to adapt to different transport technologies and support services with different requirements for assurance and fault localization.

3 Cross-Domain Naming Service (X-NS)

The Cross-Domain Naming Service (referred to hereinafter as X-NS) is implemented in a fully decentralized, federated basis and is formed by the collective of Generalized Naming Servers described above. As a result it is highly scalable. Mostly based on DNS concepts today, it is felt however that services may need different additional capabilities from the X-NS. For instance, not all services behave in the same manner with respect to naming persistency and determinism. Persistency specifies how the existence of the name is related to state of network artifacts, therefore, naming persistency may be desirable for some services but not for others. The main use of X-NS is to provide NMS with global views of the "service organization", which at its fundamental level is a translation between a service-entity abstract name and its SAP. When SAPs use well-known naming structures it is therefore possible for the NMS to identify the domain to which the service entity is attached. For instance, moms-.video may be resolved into user2.service_x@Domain_c.

4 Service Routing

Service routing is supported by X-BGP, a protocol fashioned after BGP with a number of modifications. While the role of the BGP protocol is to distribute connectivity information for services (e.g., IP, VPLS, VPN), X-BGP does it in a more scalable manner by working in coordination with the Cross-Domain Naming Service. X-BGP advertises only domain reachability. Reachability of individual users is handled by the federated naming service. This arrangement avoids the routing table explosion that is a well known BGP problem and permits the separation of user access policies from the policies for interdomain routing. The latter enables operators to change their user connection policies without requiring route re-computation.

An additional feature of X-BGP is that it provides for dissemination of service specific metrics, which depending on the service logic implemented in the NMS may result in service specific advertisement, withdrawal or ranking of routes.

5 Cross-Domain Service Requests

Cross domain service requests are supported by X-SRP, a protocol that encompasses several aspects of protocols such as RSVP and LDP. Given the diversity of the systems that are likely to interwork with X-SRP flexibility is essential to handle different response timings and fault tolerance capabilities. For instance, some NMS may use proxy signaling mechanisms to set paths while others may require to directly configure each element in the path. This introduces the need for configurable behaviours in X-SRP to enable the requesting system to adapt to the speed with which requests are processed. This is necessary since the interaction between NMSs is not to adhere to pre-specified timers like traditional protocols, but rather is designed to adapt to processing delays that may vary from domain to domain.

X-SRP also provides flexibility to accommodate upstream/downstream label assignments in a dynamic way, as determined by the adjacency service contracts. Therefore services can be set up from the end-points or from an arbitrary domain in the path of the service. This provides for flexibility to accommodate different points of initiation for the service provisioning, which translates into management processes that are adaptable to different administrative situations. For instance, if a domain in the middle initiates a service request towards the domains that host the end-points, it may be because this domain is the "administrative owner" of the end-to-end service.

Given the potential use of X-SRP in an out-of-path fashion, it is necessary to consider the behaviour of the services set-up through X-SRP in the event of failures in the Managed Adjacency Channel. The fault tolerant treatment may demand that certain services should survive the failure of their control association.

Fault tolerance of the service itself is specified in the SLS carried by X-SRP and it must be implemented by each domain according to the specification. Fault tolerance is provided in a localized manner by each domain for the service segment provided by the domain. It is implemented on capabilities of the technology used in the domain, for instance MPLS "fast re-route", or SONET protection.

6 Comparison with Signaling Approaches

Research on new approaches to signaling, especially covering cross-domain applications cover general principles or principles specific to some technologies. X-SRP is intended to provide a flexible framework for NMS to signal other NMS with service level requirements. Since service level requirements will include QoS constraints, a flexible approach based on per-domain "budget allocations" is most likely to be the right choice.

We claim:

1. A method of provisioning cross-domain services across a plurality of domains, at least two domains differing in at least one of administrator, technology, and vendor, the method comprising:

establishing adjacencies between neighbouring domains, each adjacency being defined at least by at least one service supported by a border gateway of the respective neighbouring domain and by policies that are intended to be applied;

forming a cross-domain managed service layer, extending management and control planes of network elements within each domain to inter-work in a peer-to-peer manner, each domain having a generalized naming service for identifying domains which include a service access point of a service and a service domain manager for advertising inter-domain reachability of services to neighbouring domains;

receiving at a first of the domains a service request to establish a cross-domain service; and establishing the cross-domain service.

2. The method of claim 1 wherein the service has an associated label, and wherein establishing the cross-domain service comprises:

assigning a service component to the label; and within each domain in turn:

assigning a local component to the label;

establishing segments between border gateways within the domain, the segments being identified by the local component; and if the domain does not include a service access point of the service, informing the next domain along a route of the service of the local component of the label of the domain.

3. A cross-domain managed service layer within a network comprising a plurality of domains, the domains differing in at least one of administrator, technology, and vendor, the cross-domain managed service layer comprising:

within each domain, an inter-domain adjacency manager for establishing and maintaining physical connections for services between the domain and neighbouring domains, each physical connection between the domain and the neighbouring domain being defined at least by at least one service supported by a border gateway of the respective domain and by policies that are intended to be applied;

within each domain, a signaling inter-working gateway for mapping service requests onto signaling mechanisms recognizable by the domain;

within each domain, a service request manager for establishing segments within the domain and for coordinating service segments to neighbouring domains, whereby management planes and control planes within each domain can inter-communicate in a peer-to-peer manner, within each domain, a service domain manager for advertising inter-domain reachability of services to neighbouring domains; and within each domain, a generalized naming service for identifying domains which include a service access point of a service;

wherein at least one of the inter-domain adjacency managers, the signaling inter-working gateways, the service request managers, the service domain managers, and the generalized naming services is implemented on at least one processor.

4. The cross-domain managed service layer of claim 3 further comprising:

a federated generalized naming service for identifying domains which include a service access point of a service.

5. A network element within a first domain of a network, the network including a neighbouring domain which differs from the first domain in at least one of administrator, technology, and vendor, the network element comprising:

an inter-domain adjacency manager for establishing and maintaining physical connections for services between the first domain and the neighbouring domain, each physical connection between the first domain and the neighbouring domain being defined at least by at least one service supported by a border gateway of the respective domain and by policies that are intended to be applied;

a signaling inter-working gateway for mapping service requests onto signaling mechanisms recognizable by the first domain;

a service request manager for establishing segments within the domain and for coordinating service segments to the neighbouring domain;

a service domain manager for advertising inter-domain reachability of services to the neighbouring domain; and a generalized naming service for identifying domains which include a service access point of a service, wherein at least one of the inter-domain adjacency manager, the signaling inter-working gateway, the service request manager, the service domain manager, and the generalized naming service is implemented on at least one processor.

6. A non-transitory computer-readable storage medium containing instructions for use in a network element within a first domain of a network, the instructions being executable by a computer processor, the network including a neighbouring domain which differs from the first domain in at least one of administrator, technology, and vendor, the instructions comprising:

instructions for establishing and maintaining physical connections for services between the first domain and the neighbouring domain, each physical connection between the first domain and the neighbouring domain being defined at least by at least one service supported by a border gateway of the respective domain and by policies that are intended to be applied;

instructions for advertising inter-domain reachability of services to the neighbouring domain;

instructions for maintaining a generalized naming service for identifying domains which include a service access point of a service;

instructions for mapping service requests onto signaling mechanisms recognizable by the first domain; and instructions for establishing segments within the domain and for coordinating service segments to the neighbouring domain.

* * * * *